United States Patent
Pandya et al.

(10) Patent No.: US 11,862,083 B2
(45) Date of Patent: Jan. 2, 2024

(54) ELECTRONIC DEVICES WITH CURVED DISPLAY SURFACES

(71) Applicant: Apple Inc., Cupertino, CA (US)

(72) Inventors: Sameer Pandya, Sunnyvale, CA (US); Daniel J. Barrett, Redwood City, CA (US); Erik G. de Jong, San Francisco, CA (US); James P. Landry, Campbell, CA (US); David A. Doyle, Cupertino, CA (US); Jean-Pierre S. Guillou, Los Gatos, CA (US); Jung Yun Seuh, San Jose, CA (US); Yi Qiao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 17/374,879

(22) Filed: Jul. 13, 2021

(65) Prior Publication Data
US 2022/0051622 A1    Feb. 17, 2022

Related U.S. Application Data

(60) Provisional application No. 63/065,421, filed on Aug. 13, 2020.

(51) Int. Cl.
*G02F 1/137* (2006.01)
*G09G 3/3233* (2016.01)
(Continued)

(52) U.S. Cl.
CPC ........... *G09G 3/3233* (2013.01); *G02B 6/004* (2013.01); *G02B 6/0051* (2013.01);
(Continued)

(58) Field of Classification Search
CPC .. H05K 1/18; H05K 9/00; H05K 5/00; H05K 5/03; H05K 7/20; H01L 27/28;
(Continued)

(56) References Cited

U.S. PATENT DOCUMENTS

| 6,531,230 B1 | 3/2003 | Weber et al. |
| 8,142,863 B2 | 3/2012 | Palto |

(Continued)

FOREIGN PATENT DOCUMENTS

| KR | 20140142418 A | 12/2014 |
| KR | 20150009975 A | 1/2015 |
| KR | 20190111719 A | 10/2019 |

*Primary Examiner* — Chanh D Nguyen
*Assistant Examiner* — Nguyen H Truong
(74) *Attorney, Agent, or Firm* — Treyz Law Group, P.C.; G. Victor Treyz; Tianyi He

(57) ABSTRACT

An electronic device may have a display mounted in a housing. The display may have a pixel array that produces images. A display cover layer may overlap the pixel array. The display cover layer may have a planar central area surrounded by a peripheral edge area with a curved cross-sectional profile. From an on-axis viewing angle, an image on the pixel array is fully viewable through the planar central area and the peripheral edge area. From an off-axis viewing angle, the image is partly viewable through the peripheral edge area and not through the central area. To avoid an undesired color cast in the partly viewable image seen through the peripheral edge area of the display cover layer, the display may be provided with color cast compensation structures such as a guest-host liquid crystal layer that exhibits an anisotropic colored light absorption characteristic, a diffuser layer, and/or other optical structures.

19 Claims, 9 Drawing Sheets

(51) Int. Cl.
*G02F 1/1333* (2006.01)
*F21V 8/00* (2006.01)
*G04G 17/04* (2006.01)
*G02F 1/1335* (2006.01)

(52) U.S. Cl.
CPC .... *G02F 1/13737* (2013.01); *G02F 1/133331* (2021.01); *G04G 17/045* (2013.01); *G02F 1/133541* (2021.01)

(58) Field of Classification Search
CPC ......... H01L 27/32; H01L 51/00; H01L 51/50; H01L 51/52; H01L 51/56; G02F 1/03; G02F 1/13; G02F 1/133; G02F 1/135; G02F 1/137; G02F 1/1333; G02F 1/1343; G02F 1/1335; G02F 1/1337; G02F 1/1347; G02F 1/1341; G02F 1/1368; G02B 5/00; G02B 5/22; G02B 5/30; G02B 1/14; G02B 27/02; G02B 27/26; G09K 19/52; G09G 5/00; G09G 5/02; G09G 3/20; G09G 3/32; G09G 3/34; G09G 3/36; G09G 3/3233; G09G 3/3258; G06F 1/16; G06F 1/20; H04N 7/14; H04N 5/225; H04N 5/232; H04N 13/30; H05B 33/00; F21V 8/00
See application file for complete search history.

(56) References Cited

U.S. PATENT DOCUMENTS

| | | |
|---|---|---|
| 10,551,874 B2 | 2/2020 | Prest et al. |
| 10,937,987 B1 | 3/2021 | Guillou et al. |
| 11,016,318 B2 | 5/2021 | Robinson et al. |
| 2007/0177083 A1* | 8/2007 | Fujimori ........... G02F 1/133555 349/114 |
| 2007/0268427 A1* | 11/2007 | Uehara ................ G02B 6/0038 349/86 |
| 2010/0149624 A1 | 6/2010 | Kothari |
| 2014/0152703 A1* | 6/2014 | Yang ................... H01L 51/5281 362/19 |
| 2015/0179139 A1* | 6/2015 | Watanabe ................ G09G 3/20 345/592 |
| 2016/0093833 A1* | 3/2016 | No ...................... H01L 51/5281 438/31 |
| 2019/0113799 A1* | 4/2019 | Shin ...................... G02F 1/1337 |
| 2019/0348469 A1* | 11/2019 | Large ................... G02B 5/1857 |
| 2019/0377385 A1 | 12/2019 | Bushnell |
| 2020/0026114 A1 | 1/2020 | Harrold et al. |
| 2020/0135098 A1 | 4/2020 | Tan et al. |
| 2020/0136069 A1 | 4/2020 | Paek et al. |
| 2020/0159055 A1* | 5/2020 | Robinson .............. G02F 1/0311 |
| 2020/0411599 A1* | 12/2020 | Yang .................... H01L 27/323 |
| 2021/0064836 A1* | 3/2021 | Mori ................... G02F 1/13338 |
| 2021/0208313 A1 | 7/2021 | Huang et al. |
| 2021/0382340 A1* | 12/2021 | Harrold .............. G02F 1/13475 |
| 2022/0272881 A1* | 8/2022 | Shin ..................... H05K 9/0054 |

* cited by examiner

ELECTRONIC DEVICES WITH CURVED DISPLAY SURFACES

This application claims the benefit of provisional patent application No. 63/065,421, filed Aug. 13, 2020, which is hereby incorporated by reference herein in its entirety.

FIELD

This relates generally to electronic devices, and, more particularly, to electronic devices with displays.

BACKGROUND

Electronic devices may have displays. Displays have arrays of pixels for displaying images for a user. To protect sensitive display structures from damage, displays may be provided with display cover layers.

SUMMARY

An electronic device may have a display mounted in a housing. The display may have a pixel array that produces images. A display cover layer may overlap the pixel array. The display cover layer may have a central area such as a planar central area surrounded by a peripheral edge area with a curved cross-sectional profile. From an on-axis viewing angle, an image on the pixel array is fully viewable through the central area and the peripheral edge area. From an off-axis viewing angle, the image is partly viewable through the peripheral edge area and is not viewable through the central area.

The pixel array may have pixels formed from light-emitting diodes. Due to the angular dependence of the light spectrum emitted by the light-emitting diodes, images produced by the pixels may exhibit a color cast that changes as a function of viewing angle. For example, on-axis light may be neutral in color, but off-axis light may have a yellow color cast. This may cause the portion of the image that is viewable on the peripheral edge area from the off-axis viewing direction to have a yellow color cast.

To avoid an undesired yellow color cast or other undesirable color cast in the partly viewable image seen through the peripheral edge area of the display cover layer, the display may be provided with color cast compensation structures such as a guest-host liquid crystal layer that exhibits an anisotropic colored light absorption characteristic, a diffuser layer, and/or other optical structures.

DETAILED DESCRIPTION

An electronic device may have a display. The display may include a display panel with an array of pixels for displaying images. The pixels may be thin-film organic light-emitting diode pixels or pixels formed from crystalline semiconductor light-emitting diode dies mounted on a substrate. The display may have a transparent display cover layer that overlaps and protects the display panel.

The display may have a rectangular outline with rounded corners or an outline of other suitable shapes. On the peripheral edge of the display, the display cover layer may have a curved cross-sectional profile. As light travels through the curved surface of the peripheral portion of the display cover layer, the light may be refracted. This light refraction may serve to increase the apparent lateral dimension of the display when viewed on axis and thereby help minimize amount of visible inactive border region surrounding the display. Light refraction through the peripheral portion of the display cover layer may also make a portion of the image on the display panel visible to off-axis viewers. To help ensure that the portion of the image viewable by off-axis viewers does not have an undesired yellow appearance or other undesired color cast, color cast compensation layers and/or other optical structures may be incorporated into the display. These display structures may include, for example, a diffusion layer and a guest-host liquid crystal layer with a yellow-light-absorbing dye that forms an anisotropic yellow-light-absorbing layer.

Figure 1:
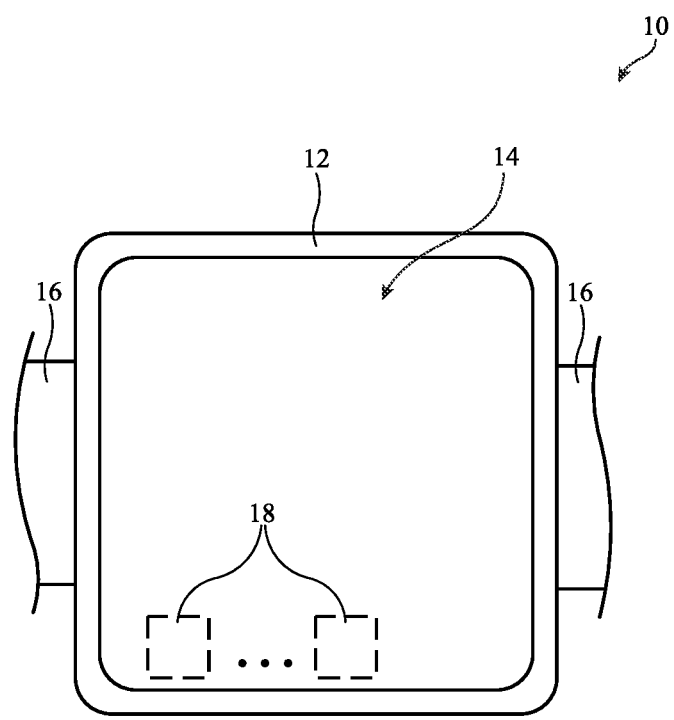
FIG. 1 is a top view of an illustrative electronic device with a display in accordance with an embodiment.

A top view of an illustrative electronic device of the type that may be provided with a display having color cast compensation structures is shown in FIG. 1. Device 10 of FIG. 1 may be a portable device such as a wristwatch having a wristband such as wristband 16, may be a portable device without a wristband such as a cellular telephone or tablet computer, or may be other suitable electronic equipment (e.g., a desktop computer, a voice-control speaker with a display panel, a television or other non-portable display, a head-mounted device, an embedded system such as a system built into a vehicle or home, an electronic device accessory, and/or other electronic device). Illustrative configurations in which device 10 is a wristwatch may sometimes be described herein as an example.

As shown in FIG. 1, device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions in which internal device components 18 are mounted and may separate the interior region of device 10 from the exterior environment surrounding device 10. In some configurations, an opening may be formed in housing 12 for a data port, a power port, to accommodate audio components, or to accommodate other devices. Clear housing regions may be used to form optical component windows. In the illustrative arrangement of FIG. 1, a transparent housing layer may cover the upper surface of device 10 and may serve as a protective display cover layer for display 14. If desired dielectric housing structures may be used to form radio-transparent areas for antennas and wireless power components.

Electrical components 18 in the interior of device 10 may include integrated circuits, discrete components, light-emitting components, sensors, and/or other circuits and may, if desired, be interconnected using signal paths in one or more printed circuits. Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output.

Output may be provided using light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, optical touch sensors, optical proximity sensors, and/or other touch sensors and/or proximity sensors, monochromatic and color ambient light sensors, image sensors, fingerprint sensors, ultrasonic sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads with movable keys, keyboards with movable keys, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensors may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, an audio component, or other input-output device in housing 12, etc.).

If desired, electronic device 10 (e.g., components 18) may include a battery or other energy storage device, connector ports for supporting wired communications with ancillary equipment and for receiving wired power, and other circuitry. In some configurations, device 10 may serve as an accessory and/or may include a wired and/or wireless accessory (e.g., a keyboard, computer mouse, remote control, trackpad, etc.).

Device 10 may include one or more displays such as display 14 (e.g., a display that includes a two-dimensional capacitive touch sensor and/or other touch sensor or a display that is insensitive to touch). Display 14 may, for example, be a light-emitting diode display such as an organic light-emitting diode display or a display having an array of pixels formed from crystalline light-emitting diode dies such as micro-light-emitting diode dies. The pixels of display 14 may be overlapped by a transparent housing structure (sometimes referred to as a transparent display cover layer, protective cover layer structures, etc.). The light-emitting portions of display 14 (e.g., thin-film light-emitting diodes or other light-emitting diodes on a substrate layer) may sometimes be referred to as forming a display panel, display layer, pixel array, or pixel array layer.

Figure 2:
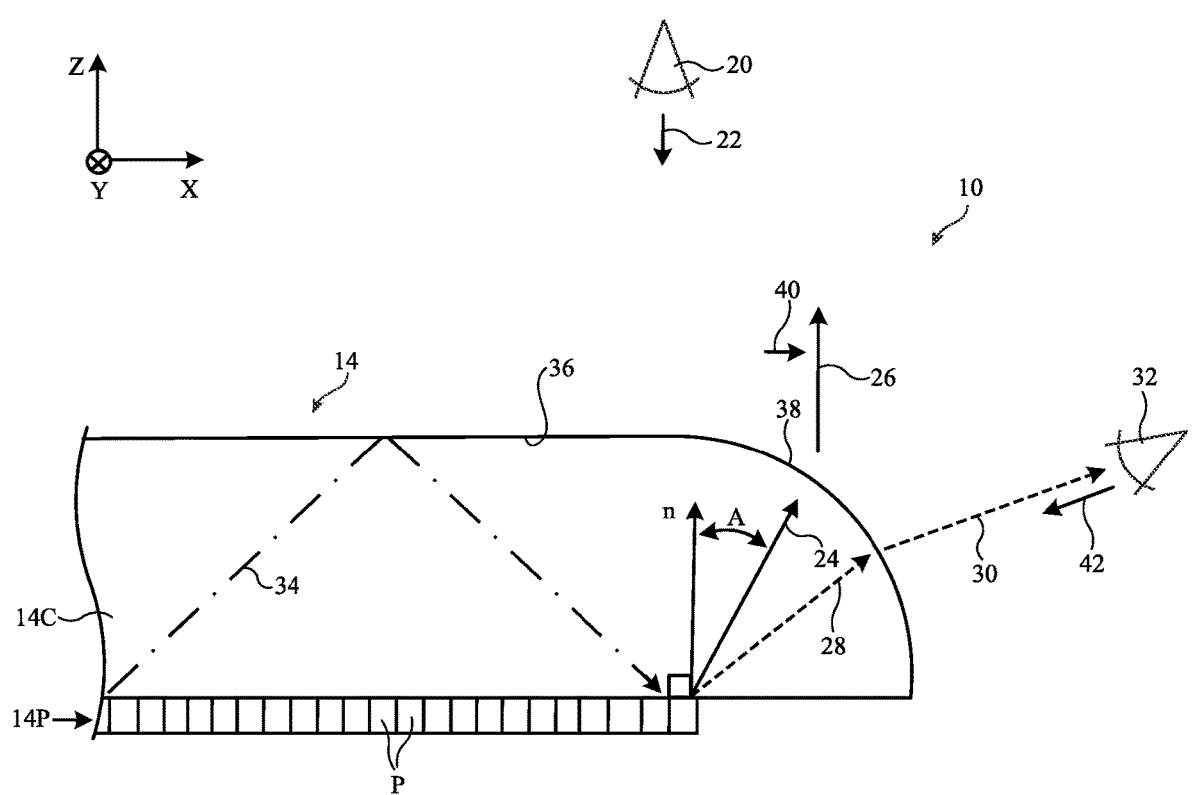
FIG. 2 is a cross-sectional side view of a portion of an illustrative electronic device with a display in accordance with an embodiment.

As shown in FIG. 2, display 14 may have a display panel such as display panel 14P with an array of pixels P forming an active area in which images are displayed. Display 14 may have an associated protective cover layer such as transparent display cover layer 14C. Display cover layer 14C may be formed from one or more layers of glass, clear polymer, crystalline material such as sapphire or other crystalline material, and/or other transparent structures(s). The presence of layer 14C may help protect the outer surface of display panel 14P from scratches, while allowing a user such as on-axis viewer 20 who is viewing device 10 in on-axis direction 22 to view displayed images through layer 12C. The center of display cover layer 14C may have a planar surface area (as an example).

During operation, pixels P emit light that travels upwardly (e.g., outwardly in the +Z direction of FIG. 2) to viewer 20 so that the image on display panel 14P is viewable as viewer 20 views display 14 in on-axis (parallel or nearly parallel to +Z) direction 22. Part of the image on display panel 14P is also viewable through the curved edge of display cover layer 14C as viewer 20 views display in on-axis direction 22. As shown in FIG. 2, peripheral edge 38 of display cover layer 14C has a curved cross-sectional profile. As a result, on-axis light rays from pixels P such as illustrative light ray 24 that are traveling in a direction oriented at a relatively small non-zero angle A with respect to surface normal n of display panel 14P may be refracted back towards the Z axis (e.g., a smaller angle A) and towards viewer 20 as indicated by refracted ray 26. Due to this light refracting property, the curved surface profile of display cover layer 14C helps move the outermost visible boundary of display 14 in direction 40. In effect, the on-axis light refraction of the curved edge of display cover layer 14C helps to enlarge the size of the image being provide by pixels P when display 14 is viewed on axis. This may help minimize the size of any inactive display border that is visible by on-axis viewer 20 who is viewing device 10 in on-axis direction 22.

When a viewer is viewing device 10 from an off-axis direction (e.g., when off-axis viewer 32 is viewing display 14 in off-axis direction 42), the viewer may view a portion of the image on display panel 14P through the curved peripheral portion of display cover layer 14C (and generally cannot view any portion of the image on display panel 14P through the planar central area on the upper surface of display cover layer 14C due to the steep angle of view associated with direction 42). For example, off-axis emitted light rays such as light ray 28, which are angled at relatively large angles A relative to surface normal n will pass to off-axis viewer 32 through curved surface 38 as shown by illustrative refracted light ray 30. The light viewed along the edge of display cover layer 14C may also include a guided light portion due to total internal reflection within layer 14C. For example, off-axis light from pixels P of display panel 14P such as off-axis light ray 34 that will reflect internally from surface 36 of display cover layer 14C in accordance with the principal of total internal reflection rather than passing outwardly towards viewer 20 through surface 36. Rays such as ray 34 may also reflect from the surface of display panel 14P. In this way, off-axis light rays such a ray 34 may propagate laterally across display 14 towards the peripheral edge of display 14 and be visible to off-axis viewers such as off-axis viewer 32 along the curved peripheral edge of display cover layer 14C.

Figure 3:
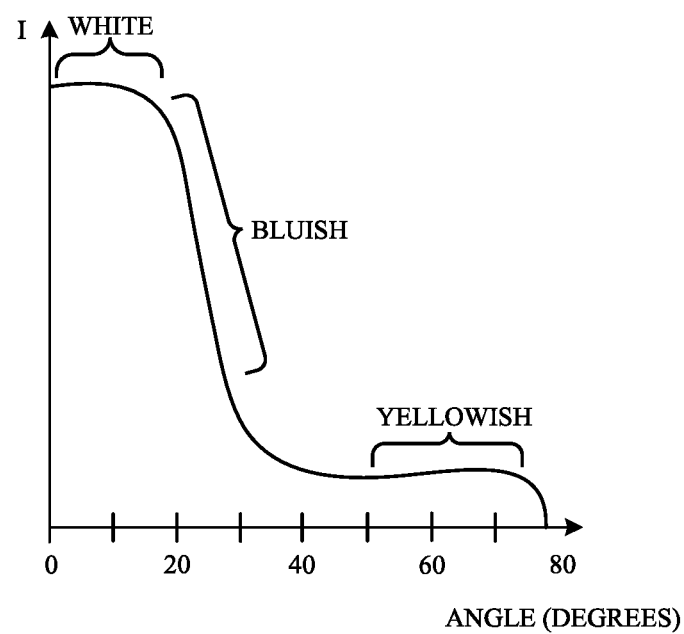
FIG. 3 is a graph of an illustrative light-emission-versus-emission-angle characteristic for a light-emitting diode pixel in accordance with an embodiment.

The portion of the image that is visible along the peripheral edge of display cover layer 14C may have an undesired color cast. This is due to changes in the color cast of light-emitting diode light emission that may be exhibited by pixels P as a function of emission angle. FIG. 3 is a graph in which the intensity I of image light from pixels P has been plotted as a function of emission angle relative to pixel array surface normal n. When light is emitted parallel to the Z axis of FIG. 2 (e.g., at an angle A=0°), the emitted light tends not to have any particular color cast (e.g., the light can have a neutral white color cast). At a light emission angle of about 25°, the color of the emitted light may tend to be bluish. At high angles, the color of the emitted light may tend to be yellowish. These color cast effects are due to the characteristics of the light-emitting didoes in pixels P. For on-axis viewing, color cast effects tend to be negligible and not noticed by on-axis viewers. When a viewer is viewing a portion of the image on display panel 14P that is visible from an off-axis perspective (e.g., where shown by off-axis viewer 32 of FIG. 2) through the curved side portion of display cover layer 14P, the yellowish color cast associated with off-angle light rays such as light-rays 28 and 34 of FIG. 2 will tend make the visible image yellowish.

To counteract this undesired image yellowing effect, display 14 may be provided with color cast compensation structures (sometimes referred to as tint-compensating optical layers, etc.).

Figure 4:
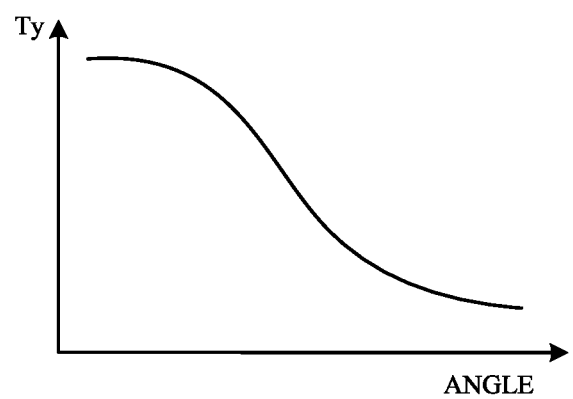
FIG. 4 is a graph of an illustrative light-transmission characteristic for an anisotropic light-absorbing layer in accordance with an embodiment.

In a first illustrative arrangement, a structure (e.g., an anisotropic layer) may be incorporated into display 14 that exhibits a preferential light-absorption for the undesired color cast at higher angles A. As shown in FIG. 4, for example, the light transmission for yellow light (transmission Ty) through this type of structure may be high at angles near 0° and low at higher angles (e.g., angles of at least 50°, at least 65°, at least 80°, etc.). An anisotropic light-absorbing layer such as a guest-host liquid crystal layer with a yellow-light-absorbing dye and a corresponding anisotropic yellow-light absorption characteristic or other suitable optical layer may exhibit this type of preferential yellow-light absorption as a function of increasing angle relative to surface normal n.

Figure 5:
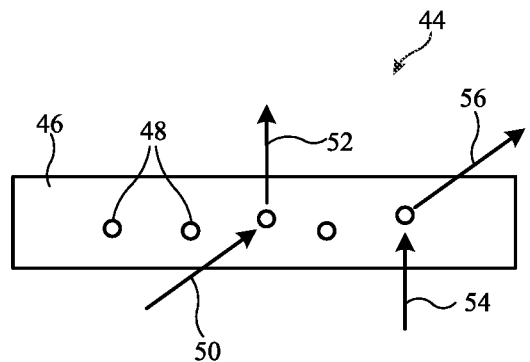
FIG. 5 is a cross-sectional side view of an illustrative light diffusing layer in accordance with an embodiment.

In a second illustrative arrangement, a light diffuser layer such as diffuser layer 44 of FIG. 5 may be incorporated into display 14. Diffuser layer 44, which may sometimes be referred to as a diffuser, light diffuser, haze layer, etc., may be formed from a polymer or other transparent material (e.g., material 46). Light-scattering structures may be formed in layer 44 to diffuse light. The light-scattering structures may include surface roughness features and/or light-scatting particles 48 (e.g., inorganic light-scattering particles such as silica microspheres or other light-scattering particles with a refractive index differing from the refractive index of material 46), voids, gas bubbles, etc. When light passes through layer 44, the light will tend to be diffused and scattered. For example, light rays propagating at a relatively high angle (see, e.g., light ray 50) may be scattered towards a lower angle (see, e.g., scattered ray 52), whereas light rays propagating at a relatively low angle (see, e.g., light ray 54) may be scattered towards a higher angle (see, e.g., scattered ray 56). The presence of diffuser layer 44 in display 14 may therefore tend to mix the light-emission angles of emitted light rays and reduce angularly dependent color cast effects.

Figure 6:
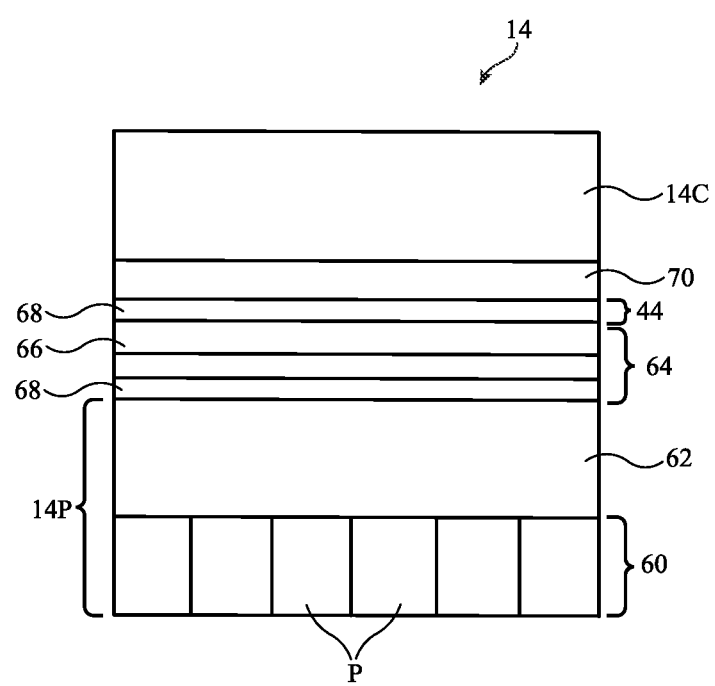
FIGS. 6, 7, 8, 9, and 10 are cross-sectional side views of portions of illustrative displays in accordance with embodiments.
Figure 7:
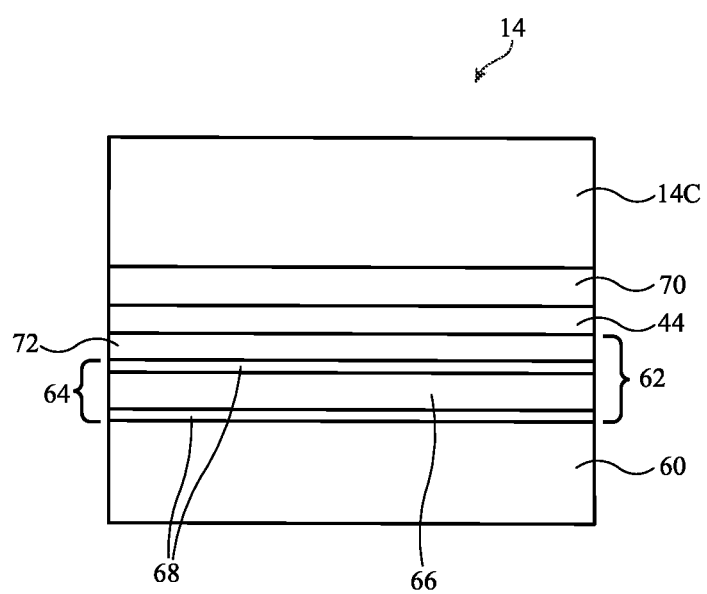
Figure 8:
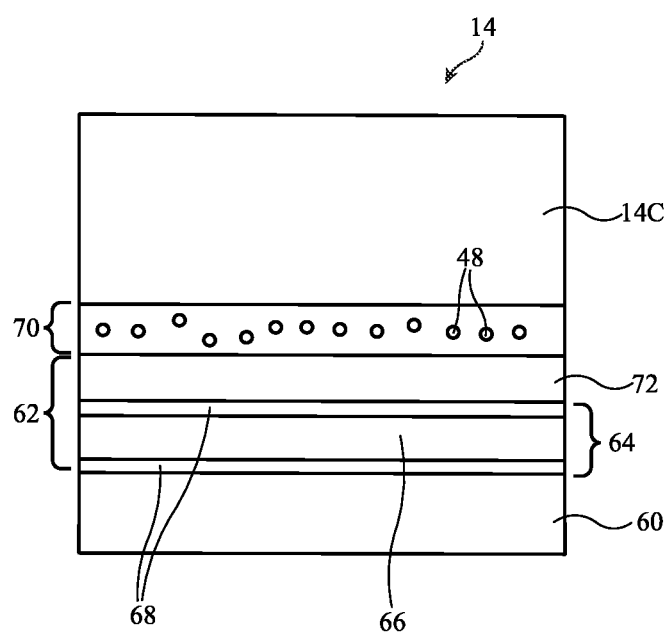

FIGS. 6, 7, and 8 are cross-sectional side views of portions of displays containing illustrative color cast compensation optical layers.

In the example of FIG. 6, display panel 14P has a pixel array 60 formed from an array of pixels P (e.g., light-emitting diode pixels). Pixel array 60 may be overlapped by a circular polarizer layer in panel 14P such as circular polarizer 62 to help suppress ambient light reflections from structures in pixel array 60. Circular polarizer 62 may have a quarter wave plate and linear polarizer. Guest-host liquid crystal layer 64 may have polymer layers 68 (e.g., liquid crystal alignment layers) and a layer of liquid crystal material such as liquid crystal material 66 sandwiched between layers 68. Material 66 may be a guest-host material that includes a light-absorbing dye such as anisotropic yellow-light-absorbing dye. Layer 64 is configured to exhibit an angularly dependent yellow light absorption characteristic (e.g., a characteristic that preferentially absorbs off-axis yellow light).

Optional diffuser layer 44 may be placed between liquid crystal layer 64 and cover glass 14C. If desired, one or more layers of adhesive may be used to attach the layers of display 14 together. For example, optically clear adhesive layer 70 may be interposed between diffuser layer 44 and cover layer 14C. With the arrangement of FIG. 6, off-axis yellow light is preferentially absorbed by layer 64 and light of different colors is scattered by layer 44, thereby helping to reduce yellowing of the image viewed from an off-axis direction such as direction 42 at the edge of cover layer 14C (FIG. 2).

In the example of FIG. 7, display panel 14P includes pixel array 60 and overlapping circular polarizer 62. Circular polarizer 62 may include a linear polarizer such as linear polarizer 72 and a wave plate interposed between linear polarizer 72 and pixel array 60. The wave plate may be a quarter wave plate formed from guest-host liquid crystal layer 64 (e.g., a layer that serves as an anisotropic yellow-light absorbing layer as well as serving as a quarter wave plate). Optional diffuser layer 44 may be interposed between display cover layer 14C and circular polarizer 62. Optically clear adhesive layer 70 may be formed between diffuser layer 44 and display cover layer 14C.

In the illustrative configuration of FIG. 8, light-scattering particles 48 have been embedded in optically clear adhesive layer 70 to form a light-diffusing layer that is interposed between display cover layer 14C and circular polarizer 62. Circular polarizer 62 of FIG. 8 may be formed from linear polarizer 72 and liquid crystal layer 64. Layer 64 may be interposed between layer 72 and pixel array 60.

In addition to or instead of using color cast compensation structures such as a light diffuser layer and/or anisotropic yellow-absorbing layer in display 14, display 14 may include color cast compensation structures formed from antireflection structures and/or may include light guide structures.

Figure 9:
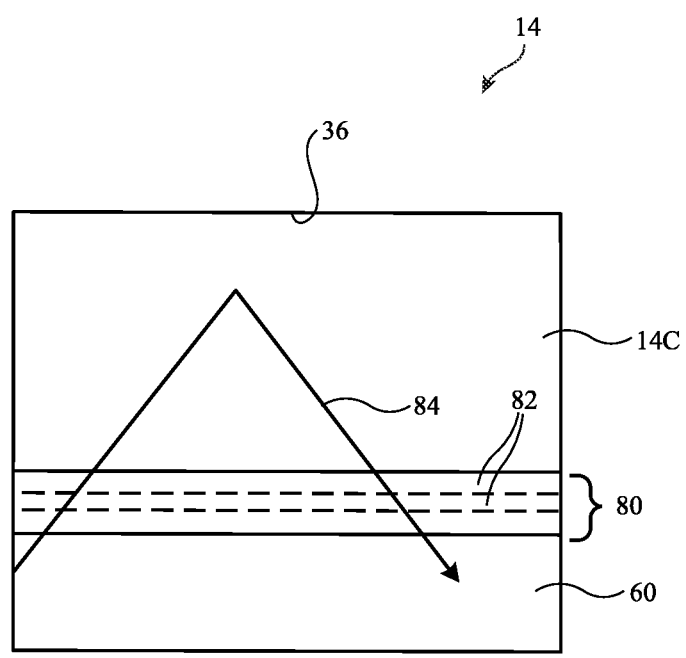

Consider, as an example, the illustrative configuration of display 14 that is shown in FIG. 9. As shown in FIG. 9, antireflection layer 80 may be incorporated between display cover layer 14C and display panel 14P. Antireflection layer 80 may be formed from a thin-film interference filter having a stack of N dielectric thin-film layers 82. The value of N may be 5-10, at least 3, at least 5, fewer than 20, or other suitable number. If desired, antireflection layer 80 may be formed from a single layer of material. Dielectric layers 82 of layer 80 may have alternating refractive index values (as an example). The refractive index values and thicknesses of layers 82 and may be configured so that layer 80 exhibits a desired wavelength dependent light transmission. For example, layer 80 may be configured to form a yellow-light antireflection coating or other coating that passes more yellow light than non-yellow light and that reflects more non-yellow light than yellow light. With this type of arrangement, yellowish off-axis light rays emitted by display panel 14P (see, e.g., yellowish off-axis light 84 of FIG. 9) may reflect internally at the interface (surface 36) between display cover layer 14C and surrounding air, but will be preferentially passed through layer 80 back into panel 14P rather than being guided further to the right within display cover layer 14C. This preferential antireflection performance of layer 80 at yellow light wavelengths tends to remove the yellow color cast from the light that is being provided at the exposed peripheral edge of display cover layer 14C.

Figure 10:
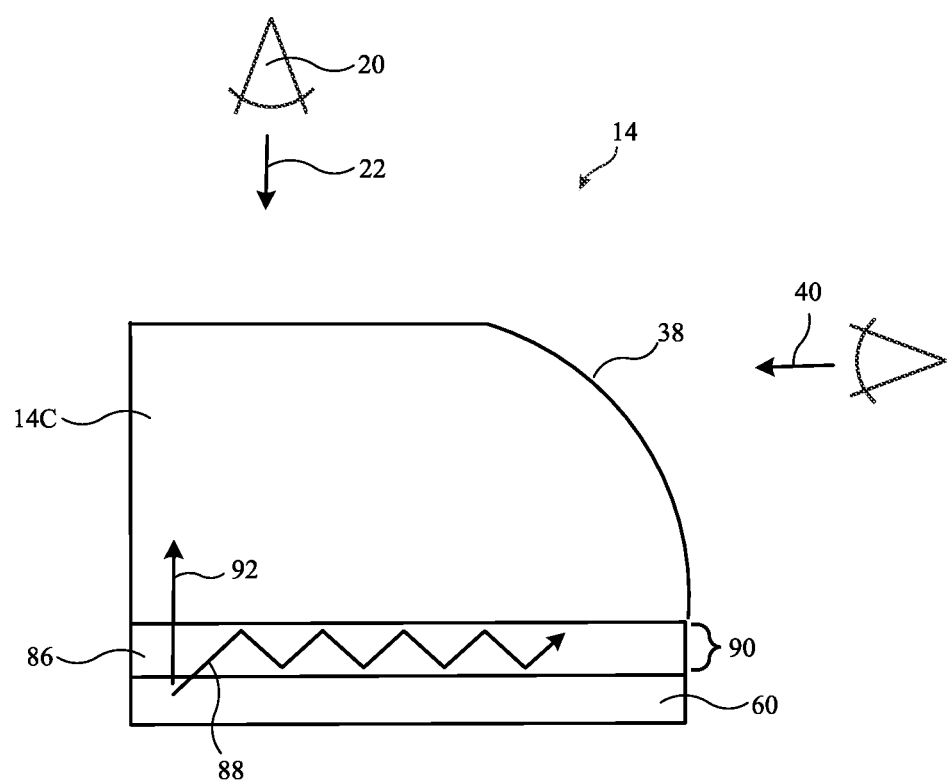

Yellow tint in the off-axis images presented by display 14 may also be reduced by shunting yellow light away from layer 14C. This type of approach is shown in FIG. 10. In the illustrative configuration of FIG. 10, intermediate optically transparent layer 86 has been formed between the inner surface of display cover layer 14C and the opposing upper surface of pixel array 60. Emitted light from the pixels of array 60 that is close to parallel with surface normal n (on-axis light 92) will pass through layers 86 and 14C for viewing by on-axis viewer 20. Emitted light from array 60 that is highly angled with respect to surface normal n (off-axis light 88) will be reflected at the interface between layer 86 and display layer 14C due to a refractive index difference between layer 86 and layer 14C. This shunts off-axis light 88 into a narrow band such as band 90 below the peripheral edge of layer 14C, leaving curved peripheral edge surface 38 of layer 14C free of off-axis image light (including undesired yellowish off-axis light). If desired, an opaque material may overlap band 90 to block light 88. Layer 14C may have a refractive index (e.g., 1.5) that is larger than the refractive index of layer 86 (e.g., 1.4) or that is smaller than the refractive index of layer 86.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
a housing; and
a display coupled to the housing, wherein the display comprises:
a pixel array configured to produce an image;
a display cover layer that overlaps the pixel array, wherein the display cover layer has a peripheral edge with a curved cross-sectional profile, the peripheral edge with the curved cross-sectional profile having a curved outer surface and a planar inner surface; and
an anisotropic color cast compensation layer containing a guest-host liquid crystal layer and a light diffusing layer that are configured to alter a color cast of a portion of the image viewed from an off-axis direction through the peripheral edge, wherein the light diffusing layer is between the guest-host liquid crystal layer and the display cover layer.

2. The electronic device defined in claim 1 wherein the guest-host liquid crystal layer comprises a light-absorbing dye.

3. The electronic device defined in claim 2 wherein the light-absorbing dye comprises a yellow-light-absorbing dye.

4. The electronic device defined in claim 3 wherein the guest-host liquid crystal layer is configured to exhibit an angularly dependent absorption of yellow light.

5. The electronic device defined in claim 4 wherein the guest-host liquid crystal layer is configured to reduce a yellow color cast in the portion of the image by absorbing yellow off-axis light more than off-axis light of non-yellow colors.

6. The electronic device defined in claim 1 wherein the display further comprises an adhesive layer between the light diffusing layer and the display cover layer.

7. The electronic device defined in claim 1 wherein the display comprises a circular polarizer and wherein the light diffusing layer comprises a layer of adhesive containing embedded light-scattering particles that is interposed between the display cover layer and the circular polarizer.

8. The electronic device defined in claim 1 wherein the display comprises a circular polarizer and wherein the circular polarizer comprises a linear polarizer and the guest-host liquid crystal layer.

9. The electronic device defined in claim 1 wherein the display comprises a circular polarizer between the guest-host liquid crystal layer and the pixel array.

10. The electronic device defined in claim 1 further comprising an antireflection layer between the pixel array and the display cover layer that is configured to reduce reflections of yellow light relative to non-yellow light.

11. The electronic device defined in claim 1 further comprising an optically transparent layer between the display cover layer and the pixel array that is configured to shunt off-axis light away from the peripheral edge with the curved cross-sectional profile.

12. The electronic device defined in claim 1 further comprising a wristband coupled to the housing.

13. The electronic device defined in claim 1, wherein the guest-host liquid crystal layer contains a light-absorbing dye and wherein the light diffusing layer contains embedded light-scattering particles.

14. An electronic device, comprising:
a housing;
a pixel array configured to produce an image;
a display cover layer that overlaps the pixel array, wherein the display cover layer has a peripheral edge with a curved cross-sectional profile;
a guest-host liquid crystal layer with a yellow-light-absorbing dye;
a light diffuser layer containing embedded light-scattering particles between the guest-host liquid crystal layer and the display cover layer; and
a circular polarizer interposed between the guest-host liquid crystal layer with the yellow-light-absorbing dye and the pixel array.

15. The electronic device defined in claim 14 wherein the image is viewable from a first direction in which yellow light is not removed from the image by the yellow-light-absorbing dye and is viewable from a second direction in which yellow light is removed from the image by the yellow-light-absorbing dye.

16. The electronic device defined in claim 15 wherein:
the display cover layer comprises a planar surface area and a curved surface area associated with the curved cross-sectional profile;
the image is viewable from the first direction through the planar surface area and through the curved surface area; and
the image is at least partly viewable from the second direction through the curved surface area and is not viewable through the planar surface area.

17. A wristwatch, comprising:
a housing;
a wristband coupled to the housing;
a display cover layer coupled to the housing that has a planar area surrounded by a peripheral edge with a curved cross-sectional profile;
a planar pixel array overlapped by the display cover layer, wherein the planar pixel array is configured to produce an image that is fully viewable from an on-axis direction through the planar area and that is partly viewable from an off-axis direction through the peripheral edge; and
a color cast compensation layer that is configured to not alter a color cast of the fully viewable image viewed from the on-axis direction and is configured to adjust the color cast of the partly viewable image viewed from the off-axis direction, wherein the color cast compensation layer comprises a light diffuser layer containing embedded light-scattering particles configured to adjust the color cast of the partly viewable image viewed from the off-axis direction and wherein the color cast compensation layer further comprises a guest-host liquid crystal layer between the light diffuser layer and the planar pixel array.

18. The wristwatch defined in claim 17, wherein the guest-host liquid crystal layer contains a light-absorbing dye configured to adjust the color cast of the partly viewable image viewed from the off-axis direction.

19. The wristwatch defined in claim 17 further comprising:
a circular polarizer between the light diffuser layer and the planar pixel array, wherein the circular polarizer comprises a linear polarizer and the guest-host liquid crystal layer forming a quarter wave plate for the circular polarizer.

* * * * *